US006311651B1

(12) United States Patent
Singh

(10) Patent No.: US 6,311,651 B1
(45) Date of Patent: Nov. 6, 2001

(54) COMPUTER CONTROLLED SIX STROKE INTERNAL COMBUSTION ENGINE AND ITS METHOD OF OPERATION

(76) Inventor: Satnarine Singh, 63 La Plaisance Road, La Romain, West Indies (TT)

( * ) Notice: Subject to any disclaimer, the term of this patent is extended or adjusted under 35 U.S.C. 154(b) by 0 days.

(21) Appl. No.: 09/465,329

(22) Filed: Dec. 17, 1999

(51) Int. Cl.$^7$ .................................................. F02B 47/02
(52) U.S. Cl. .......................................... 123/25 C; 123/64
(58) Field of Search ..................................... 123/25 C, 64

(56) References Cited

U.S. PATENT DOCUMENTS

| | | |
|---|---|---|
| 1,339,176 | 5/1920 | Dyer . |
| 1,501,392 | 7/1924 | Burtnett et al. . |
| 2,671,311 * | 3/1954 | Rohrbach ............................ 123/25 C |
| 3,964,263 * | 6/1976 | Tibbs .................................. 123/25 C |
| 4,143,518 | 3/1979 | Kellogg-Smith . |
| 4,736,715 * | 4/1988 | Larsen ................................ 123/25 C |
| 4,976,226 * | 12/1990 | Herman ............................... 123/25 C |
| 6,095,100 * | 8/2000 | Hughes .............................. 123/25 C |
| 6,112,705 * | 9/2000 | Nakayama et al. ................ 123/25 C |

* cited by examiner

*Primary Examiner*—Willis R. Wolfe
*Assistant Examiner*—Jason A Benton
(74) *Attorney, Agent, or Firm*—Malloy & Malloy, P.A.

(57) ABSTRACT

An internal combustion engine and its method of operation which is designed to operate on a six-stroke cycle and which may include at least one but preferably a plurality of piston and cylinder assemblies each of which are characterized by a cylinder having a piston reciprocally mounted therein and intake an exhaust valves cooperatively mounted to regulate fluid flow into and out of the cylinder. An injection assembly is connected to each of the piston and cylinder assemblies and structured to inject water into the cylinder during a predetermined portion of the six-stroke cycle. A central processor is responsive to signals received from a sensor assembly mounted on the internal combustion engine at strategic locations so as to determine the energy content within the one or more cylinders and thereby regulate and control the timing and quantity of the injected water. The injected water gradually converts to steam without first exhausting the ignited air fuel mixture, thereby generating an additional power stroke. 22

35 Claims, 2 Drawing Sheets

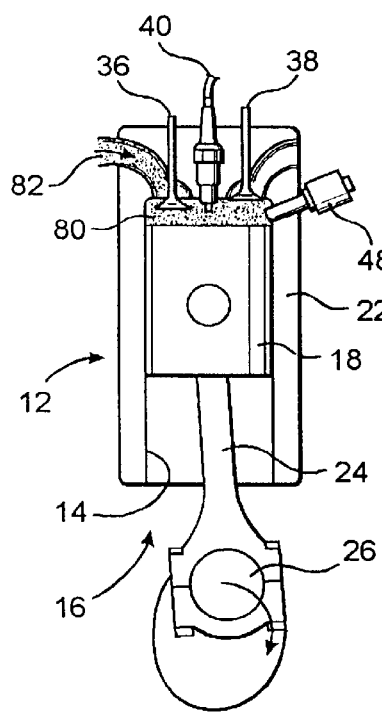
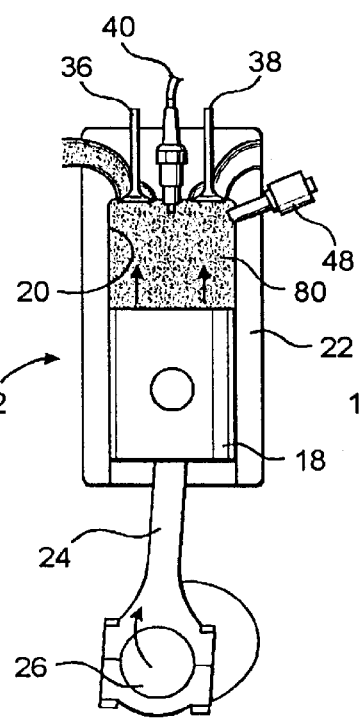
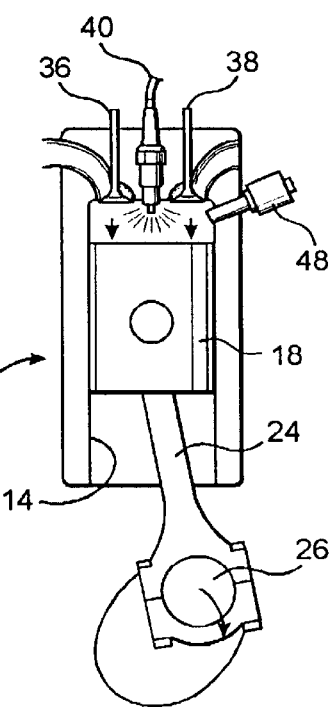
FIG. 2A	FIG. 2B	FIG. 2C
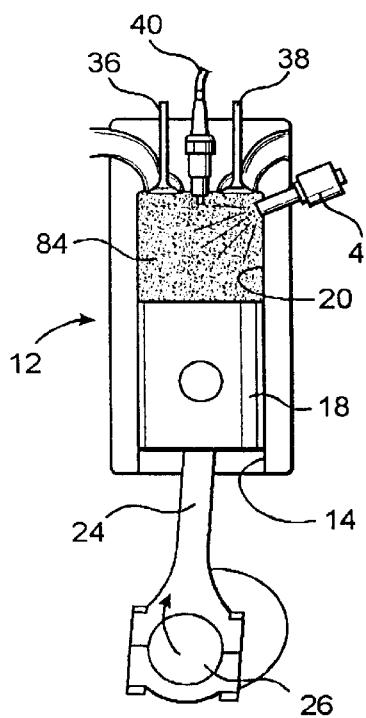
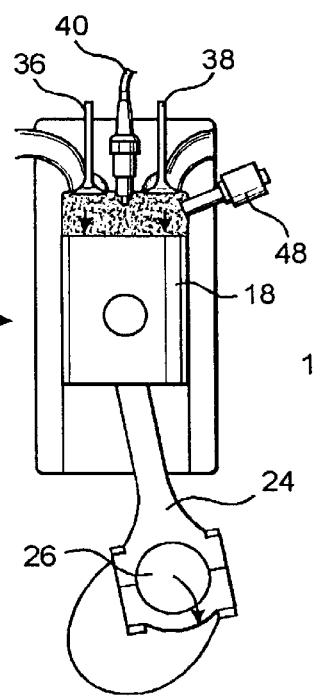
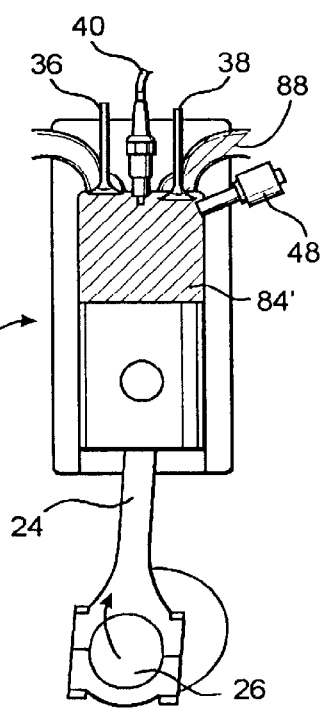
FIG. 2D	FIG. 2E	FIG. 2F

COMPUTER CONTROLLED SIX STROKE INTERNAL COMBUSTION ENGINE AND ITS METHOD OF OPERATION

BACKGROUND OF THE INVENTION

1. Field of the Invention

This invention relates to a computer controlled, internal combustion engine designed to operate on a six-stroke cycle, wherein water is injected into each of the one or more cylinders during a predetermined portion of the six-stroke cycle depending upon the energy content within the cylinder subsequent to ignition of the conventional air-fuel mixture. The residual heat from the ignited air-fuel mixture serves to convert the injected water into steam on a controlled basis, thereby creating an auxiliary power stroke.

2. Description of the Related Art

It is well known that for over a hundred years the internal combustion (IC) engine was and is the dominating source of power for motorized vehicles. Other than rotary engines, the typical IC engine incorporates a plurality of piston and cylinder assemblies each of which includes a cylinder having a piston reciprocally mounted therein and wherein a combustible fluid, such as an air-fuel gaseous mixture, is forced into the interior of the cylinder, compressed and subsequently ignited. The ignition of the combustible fluid causes a significant expansion of gases within the cylinder, resulting in the piston being forced downwardly within the cylinder and thereby, defining what is commonly known as a "power stroke". The piston is drivingly connected to a crank shaft which is drivingly connected to the remainder of the drive train associated with the motorized vehicle.

Over the years, numerous attempts have been made to increase the efficiency of IC engines, while at the same time protecting the environment by eliminating or significantly reducing the exhausting of pollutants into the surrounding atmosphere. Attempts to protect the environment, have resulted in significant improvements in exhaust systems, fuel compositions and other operational components of modern IC engines, which sometimes derogatorily affect the efficiency or performance characteristics of such engines. Other attempts to improve the performance of IC engines, without harming the environment, have the included the design of an IC engine which operates on a six-stroke cycle. In such designs, the first four strokes function as a conventional internal combustion engine and include an intake stroke, compression stroke, power stroke and exhaust stroke. The last two strokes of the six-stroke cycle include the injection of water into the combustion chamber for purposes of converting the water to steam by using the residual heat remaining therein. The expansion of the steam is intended to provide an additional power stroke, without additional fuel or combustible fluid being supplied. However, for the most part, such known attempts have failed to provide an internal combustion engine capable of operating on a six-stroke cycle, which is sufficiently efficient and effective for wide spread commercial use.

In order to understand the problems associated with the effective development of an IC engine of the type set forth above, it is important to understand the relationship between water, steam, temperature and pressure, all of which are governed by the laws of thermodynamics, and more specifically, by what are commonly referred to as the "Steam Tables". Accordingly, and based on these laws, it is well recognized that in a closed container or system, for example, heated water will be maintained in a liquid state at a temperature of 297 degrees Fahrenheit, only as long as the pressure is maintained at a minimum of 50 PSI. However, if the heated water were suddenly to be released from the closed container into atmosphere it would immediately "flash" into steam due to the significant drop in pressure. The reason for this instant conversion into steam is because the water has sufficient latent heat for the steam conversion and no longer has to absorb heat from an exterior source.

Prior attempts to take advantage of the force generated when the water converts to steam in the combustion chamber or cylinder an IC engine have, for the most part, failed due to the fact that the water was injected and allowed to convert or "flash" into steam at the wrong time during the six-stroke cycle. Allowing all of the water injected into a cylinder to simultaneously flash into steam would most probably result in damage to the engine due to the "instant" expansion force created. Rather than developing a power stroke in the engine, such an expansive force would have a tendency to crack the engine block or cause a failure in the seals between the piston and the interior surface of the cylinder. Accordingly, it is believed by the inventor hereof that in order to develop an efficient IC engine incorporating the conversion of injected water into steam, the conversion should be controlled and take place continuously or gradually over the duration of a specific predetermined portion of the six-stroke cycle, rather than instantaneously upon injection of the water into the cylinder.

The failure of previous attempts at water to steam conversion is further evidenced by an explanation of the ignition of a conventional air-fuel mixture in a conventional IC engine. More specifically, after the air-fuel mixture is compressed and ignited, the mixture burns and expands, thereby supplying a continuous force which drives the piston the length of the cylinder resulting in a "power stroke". This happens because the combustion of the air-fuel mixture occurs on a substantially continuous basis as the piston travels the length of the cylinder during the power stroke. All of the force or power resulting from the ignition of the air-fuel mixture is not released or exerted on the piston at one point in time. Therefore, it is believed by the inventor hereof that the control of the conversion of water into steam should similarly occur on a continuous rather than an instantaneous basis in order for such conversion to produce an effective and efficient additional power stroke in a six-stroke cycle.

Another characteristic common to known attempts to develop a six-stroke cycle IC engine is the premature exhausting of the conventional air-fuel mixture after it has been ignited. It is generally accepted that exhaust gases contain approximately 30% of the energy of the fuel charge due to inherent designs of known or substantially conventional I.C. engines. However, if the exhaust gases can be maintained within the cylinder and properly mixed with a quantity of water being injected, the heat energy still remaining in the previously ignited fuel charge can be utilized to add another power stroke, occurring upon the conversion of water into steam within the cylinder.

Based on the above, there is a significant and recognized need for the development of an improved internal combustion engine which is capable of efficiently operating on a six-stroke cycle which includes the development of an additional power stroke through the injection of water into the cylinder or combustion chamber and the conversion of water into steam. The water to steam conversion should occur on a controlled basis and be at least partially dependent on the energy content within the cylinder, subsequent to ignition of a conventional air-fuel mixture and prior to the ignited air-fuel mixture being exhausted. Any such improved internal combustion engine should preferably have the injection of water and its conversion into steam controlled by a computer assembly or central processor, properly programmed in accordance with the related laws of thermodynamics and the conversion of water to steam in accordance with the "Steam Tables".

SUMMARY OF THE INVENTION

The present invention is directed towards a computer controlled internal combustion (IC) engine, and its method of operation, designed to operate on a six-stroke cycle and specifically includes the injection of water into the combustion chamber or cylinder of each of a plurality of piston and cylinder assemblies, during a predetermined portion of the six-stroke cycle. More specifically, the quantity and timing of the water injection is controlled and regulated to the extent that the injected water is prevented from turning into steam even after reaching sufficiently high temperatures because of the continuously increasing pressure within the cylinder due to the compression of gases therein, to the extent that the water is maintained in a liquid state until the beginning of an intended "auxiliary" power stroke.

More specifically, the IC engine of the present invention comprises at least one, but preferably a plurality of piston and cylinder assemblies. Each such piston and cylinder assembly includes a cylinder which serves as a combustion chamber having a piston reciprocally mounted therein, and further including intake and exhaust valves associated therewith so as to regulate the flow of fluid into an out of the cylinder. A source of ignition is also connected to each chamber and may be in the form of a spark plug, glow plug or any other applicable and/or conventional means of igniting a combustible fluid, such as a gaseous mixture of fuel and air.

In addition to the above, the improved IC engine of the present invention includes an injection assembly comprising one or more injector structures associated with each of the cylinders and disposed and structured to inject predetermined quantities of water at predetermined rates and times into the individual cylinders under the control and regulation of a central processor. A central processor or computer of the general type referred to is known in the automobile and/or internal combustion engine industry for the control and regulation of a variety of operating conditions of the IC engine. However, the central processor of the present invention is responsive to a plurality of sensors, all of which serve to define a sensor assembly, which sense and/or determine certain predetermined physical characteristics relating to the operation and performance of the engine. The physical characteristics determined by the plurality of sensors include, but are not limited to, the pressure and temperature of the interior of each cylinder at a first predetermined portion of the six-stroke cycle. The determination of the pressure and temperature aid in the calculation of what may be referred to as the "energy content" within the cylinder during at least this first predetermined portion of the six-stroke cycle. In addition, one or more of the plurality of sensors are mounted on the engine to determine the engine speed as well as the temperature of the water being injected into the cylinder prior to its injection. As described in greater detail hereinafter, the determination of the engine speed by the sensor assembly will, in turn, inform the central processor of the rate of travel of the pistons within respective ones of the cylinders. Since it is important that water, when injected into the cylinder absorb the maximum amount of heat without turning into steam, the determination of the central processor of the rate of travel of the piston within the cylinder will allow the central processor to determine the length of time a predetermined stroke exists. This in turn will allow the central processor to inject water into the cylinder at a time during a predetermined stroke that will allow the injected water to spend the maximum amount of time in the cylinder and thereby absorb the maximum amount of heat, without turning into steam. Informing the central processor of the amount of time the various quantities of injected water spend in the cylinder, absorbing heat, better assures that maximum heat energy is extracted, thereby resulting in a more efficient auxiliary power stroke being subsequently produced.

The temperature of the water prior to it being injected into the cylinder will also be communicated to the central processor so as to aid in the calculation of the amount of heat required to convert the water into steam specifically during the second predetermined portion of the sixth stroke cycle.

The central processor will thereby be informed of the operating and performance characteristics of the IC engine under varying speed and load conditions. Such operating conditions will, of course, have a direct effect on the physical conditions within each of the cylinders during the operation of the IC engine. As a result the "energy content" of each cylinder, immediately prior to and during the injection of water into the cylinder will be calculated by the central processor in order to determine the quantity of water to be injected into the cylinder as well as the time or period during which such injection will occur. More specifically, the quantity of water to be injected can be calculated based on the amount of heat required to convert it to steam. Also, the amount of water to be injected will be determined by the temperature of the water before its injection into the cylinder. It should be apparent that the higher the temperature of water being injected into the cylinder the greater the quantity of water that can be injected, in that less heat will have to be absorbed from the "energy content" of the interior of the cylinder into which the water is to be injected, to convert the injected water into steam.

Another directly related responsibility of the central processor is to calculate when or over what duration of the six-stroke cycle is the water to be injected. The timing of the water injection is important in order to prevent the water from being converted into steam during the compression stroke upon its injection into the cylinder. More specifically, as the water is injected, its temperature significantly and rapidly increases. Accordingly, the pressure exerted on the injected water must also significantly and proportionally increase in order to prevent the formulation of steam. Therefore, the aforementioned second predetermined portion of the six-stroke cycle, during which the water is injected, must be during a portion of a compression stroke. During this compression stroke, the piston is rising through the cylinder so as to compress its contents, including both the combustible fluid, which had already been ignited, and the water being injected. Therefore, as the water is continuously and/or periodically being injected, in an amount based on the aforementioned "energy content" of the cylinder, during at least a majority of this compression stroke, the pressure thereon is continuously increasing. The injection of the water in a regulated and controlled manner by the central processor, as set forth above, will force the water to be maintained in a liquid state and prevent its conversion into steam until the beginning of the following power stroke. This following stroke will define an "auxiliary" power stroke because of a forced, downward travel of the piston upon the conversion of the water into steam. The result will be a gradual decrease in pressure as the piston moves towards its bottom dead center (BDC) position during this auxiliary power stroke. Therefore, subsequent to the compression of the ignited combustible fluid and the injected water, the piston will began its travel from its top dead center (TDC) position to the BDC position with the resulting gradual decrease in pressure on the injected water. Accordingly, there will be a continuous or gradual conversion of the water into steam because of the pressure reduction thereon and the fact that the water has absorbed sufficient heat from the "energy content" within the cylinder into which it is being injected to accomplish the water to steam conversion. As set forth above, this conversion will generate an auxiliary power stroke as the piston is forced to travel from its TDC position to its BDC position.

Therefore, the improved IC engine of the present invention will allow the development of significantly more power from relatively smaller size engines while operating at an increased efficiency level. The increase in efficiency will be due to the development of two power strokes using the same amount of combustible fluid or air-fuel mixture. The admission of pollutants into the atmosphere will also be reduced since the exhausting of the previously ignited combustible fluid only occurs at the end of the six-stroke cycle along with the steam. Further, the resulting IC engine can operate on a lower compression ratio, thereby eliminating the necessity of using more expensive, high octane fuels. In addition to the above, the computer controlled IC engine of the present invention will be environmentally friendly by enabling the use of less combustible or fossil fuel, while allowing the engine to do a greater amount of work.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIGS. 2A through 2F consecutively represent successive strokes of at least one of a plurality of piston and cylinder assemblies incorporated within the internal combustion engine of the present invention while operating on a six-stroke cycle.

Like reference numerals refer to like parts throughout the several views of the drawings.

DETAILED DESCRIPTION OF THE PREFERRED EMBODIMENT

Figure 1:
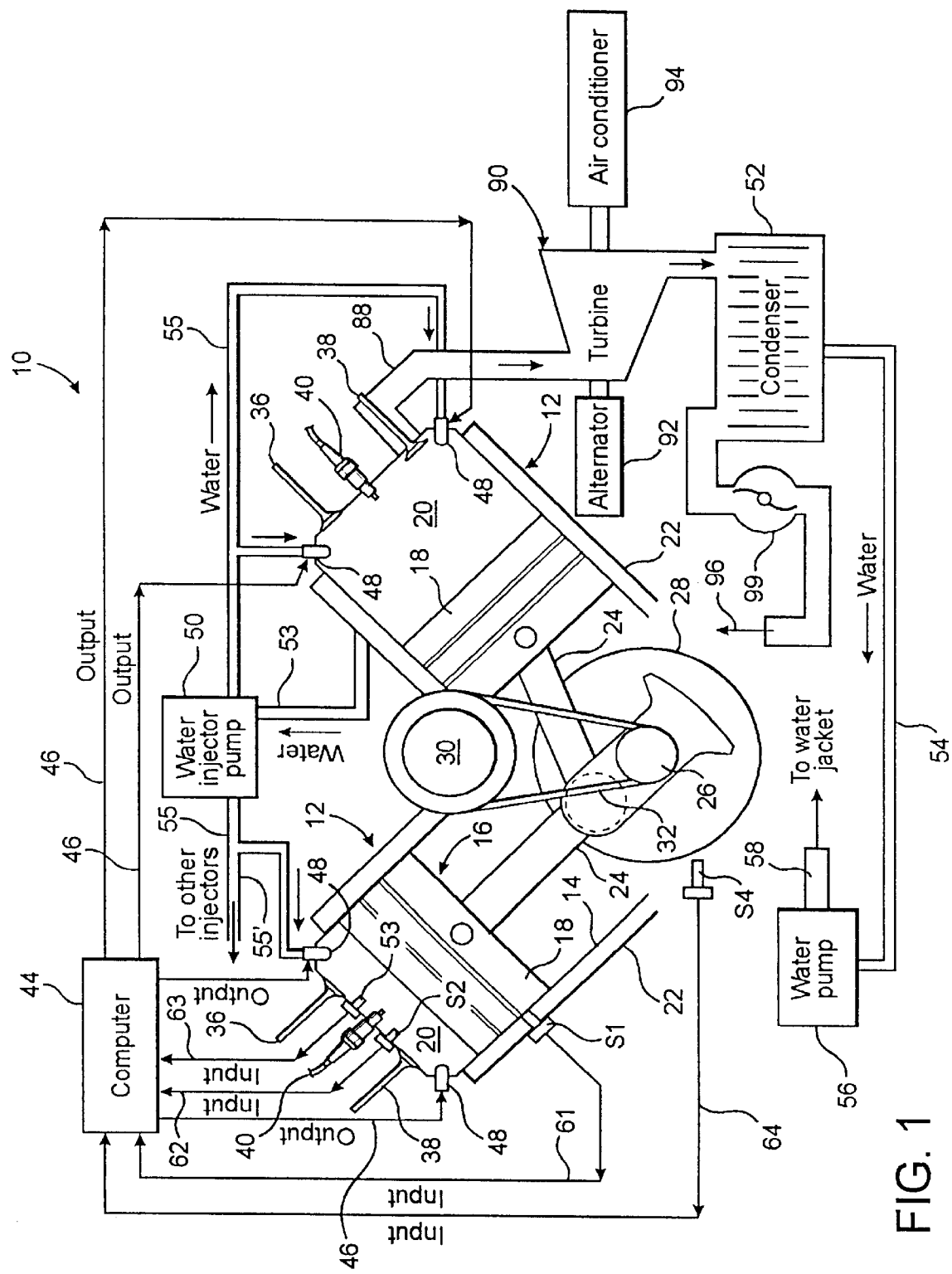
FIG. 1 is a schematic representation of various operative components of a computer controlled internal combustion engine according to the present invention.

The present invention is directed towards a computer controlled internal combustion (IC) engine, and its method of operation, wherein the IC engine is designed to operate on a six-stroke cycle and provide an auxiliary power stroke through the regulated injection of water into the combustion chamber or cylinder of one or more piston and cylinder assemblies of the engine and the conversion of the injected water into steam. It is emphasized that while the present invention will be explained primarily with reference to a single piston and cylinder assembly having an at least partially conventional design, the computer controlled IC engine of the present invention may be of the type incorporating one or a plurality of such piston and cylinder assemblies and may be specifically adapted for use as the power source in an automobile, truck or other motorized vehicle.

With reference to the accompanying Figures, the IC engine of the present invention has a plurality of operative components schematically represented in FIG. 1 and collectively indicated as 10. The IC engine 10 comprises preferably a plurality of piston and cylinder assemblies generally indicated as 12 which include a cylinder 14 having a piston 16 including piston head 18 reciprocally mounted within the interior 20 of the cylinder 14. A water jacket 22 is disposed in surrounding relation to the cylinder 14 and is designed to have a quantity of water circulating therethrough so as to provide proper cooling to each of the piston and cylinder assemblies 12. The piston heads 18 are connected by piston shafts 24 to a driven crank shaft 26 attached to fly wheel 28. In addition, a cam shaft 30 is driven by an interconnecting belt or like structure 32 and is rotated or driven at an applicable gear ratio, such as a preferred ratio of 3 to 1. In addition, each of the piston and cylinder assemblies 12 includes an intake valve 36 and an exhaust valve 38 cooperatively structured to regulate fluid flow into an out of the interior 20 of the cylinder 14. An ignition source 40 may be in the form of a spark plug, glow plug or any other means for igniting a combustible fluid, such as a conventional air-fuel gaseous mixture.

The IC engine, as described above, will operate in a conventional fashion through the first three strokes of the aforementioned six-stroke cycle to the extent that a combustible air-fuel gaseous mixture will be forced into the interior 20 by appropriate structure (not necessary to be shown as this is within the knowledge of persons of skill in the art), where it will be compressed and subsequently, ignited by the ignition source 40. Upon ignition, the expansion of the ignited gasses will cause the piston 18, in each of the cylinders 14, to be driven downwardly from its top dead center (TDC) position to its bottom dead center (BDC) position, thereby defining a power stroke. The power stroke drives the crank shaft 26 and fly wheel 28 and provides a motor or moving force to the vehicle in which the IC engine 10 is mounted.

With further reference to FIG. 1, important operative components of the present invention include a computer or central processor 44 which is interconnected by outputs 46 to a plurality of injector structures 48. Each of the cylinders 14 has at least one, but preferably, a plurality of the injector structures 48 mounted thereon in direct fluid communication with the cylinder interior 20. The injector structures 48 are designed to direct water at prescribed times and in a prescribed manner into the cylinder interiors 20. As will be explained in greater detail hereinafter, the water may be injected in small amounts or "periodically" during a predetermined portion of the six-stroke cycle. The water to be injected preferably originates from the water circulating through the water jackets 22 surrounding each of the cylinders 14. The water jackets 22 may comprise part of a water supply and what may be referred to as a closed water system. The term "closed water system" refers to the fact that the water injected into the interior 20 of each of the cylinders 14 is retrieved and recirculated so as to flow back into the interior of the water jackets 22 to maintain the predetermined lower temperature of the cylinders 14. As will be explained in greater detail hereinafter, the closed water system also includes a water injector pump 50 connected by appropriate ducting 55 between the one or more water jackets 22 and each of the injector structures 48. The closed water system further preferably includes a condenser 52 designed to receive steam from the exhaust exiting each of the cylinder interiors 20, through outlet 88. The condenser 52 collects the water recovered by condensing the retrieved steam and forces it through return line 54 by means of a water return pump 56. The water is further directed by conduits 58 back to each of the one or more water jackets 22, thereby further defining the aforementioned closed water system.

As set forth above, one inventive feature of the present invention is the injecting of the water in specific quantities and during a specific portion of the six-stroke cycle, wherein the amount and time of water injection for each cylinder is controlled by the central processor 44. In order to determine or calculate the proper parameters for water injection, as set forth above, a sensor assembly is mounted on the various operative components of the IC engine 10 and is structured to determine certain physical characteristics and transmit this sensed or determined data, relating to such physical characteristics, to the central processor 44 for processing. Accordingly, the sensor assembly of the present invention comprises at least one, but preferably, a plurality of sensor structures mounted at various locations on the IC engine 10 and which are specifically structured to sense and determine specific, predetermined physical characteristics required for appropriate calculation by the central processor 44. The plurality of sensors of the sensor assembly includes a sensor structure $S_1$ mounted in the vicinity of the water jacket 22 and structured to determine the temperature of the water prior to it being injected into the cylinder interior 20. The temperature of the water prior to injection is important because the greater the temperature of the water to be injected the greater quantity of water that can be injected because less heat is required to be absorbed from the "energy content" of the cylinder to convert the water into steam. More specifically, the hotter the water being injected, the less amount of heat or energy need be taken from the interior of the cylinder, subsequent to the combustible fluid being ignited, in order that the water be converted into steam in a controlled manner, as will be explain in greater detail hereinafter.

The sensor assembly of the present invention also includes at least one but preferably a plurality of additional sensor structures $S_2$ and $S_3$ both of which may be mounted in the same cylinder interior 20 or each of which may be mounted in a different cylinder interior. Therefore, the temperature and pressure of the cylinder interiors 20 of the various piston and cylinder assemblies 12 are directed to the central processor 44 for further processing in defining what is referred to as the "energy content" of each of the cylinders immediately prior to the injection of water therein. The calculation or determination of the energy content will directly affect the quantity of water being injected as well as the time and/or duration such water injection will take place during a predetermine portion of the six-stroke cycle. In addition to the above a sensor structure $S_4$ is mounted on the engine in the vicinity of the fly wheel 28 and/or crank shaft 26 in order to determine engine speed. Engine speed is, of course, directly related to the speed of the travel of the piston head 18 within the cylinder interior, which in turn may be communicated to the central processor 44 so as to determine the length of time a particular stroke exists during the six-stroke cycle. In order to obtain the maximum power from the auxiliary power stroke or fifth stroke, the injected water should remain within the cylinder a maximum amount of time, during the fourth stroke, so as to absorb a maximum amount of heat, without turning into steam during the fourth stroke. Heat absorption during the fourth stroke depends, at least in part, upon the length of time of the fourth stroke and that time is dependent on the time the piston head 18 takes to travel from its BDC position to its TDC position. The central processor 44 must be informed of the amount of time each injection of water spends in the cylinder absorbing heat, during the fourth stroke, without turning into steam, so that the maximum heat energy can be extracted, thereby assuring that a more efficient fifth stroke or auxiliary power stroke is produced. The length of time of the fourth stroke is measured by determining the engine speed which, as set forth above, is directly related to the time of travel of the piston head 18 from BDC to TDC. The data relating to engine speed, as determined by sensor structure $S_4$. is particularly important when the vehicle is operating at varying speed or load conditions. Such varying operative conditions will have a direct effect on the mass of combustible fluid forced into the interior 20 of each of the cylinders 14. Interconnection between each of the plurality of sensor structures $S_1$, $S_2$, $S_3$, and $S_4$ is by means of any type of applicable electrical connection such as at 61, 62, 63 and 64 respectively. It should also be noted that for purposes of clarity, FIG. 1 depicts the various sensors $S_2$ and $S_3$ being mounted in operative position with regards to only a single cylinder interior 20. However, it is emphasized that an increased number of such sensor structures can be mounted in operative relation to each of the piston and cylinder assemblies 12 which are incorporated in the IC engine 10 of the present invention.

FIGS. 2A through 2F, demonstrate the operation of the internal combustion engine 10, by a successive representation of each stroke of a six-stroke cycle, wherein the six-stroke cycle comprises a first intake stroke demonstrated in FIG. 2A. During the intake stroke, a combustible fluid 80, preferably in the form of an air-fuel gaseous mixture, is drawn into the interior of the cylinder 20 through inlet 82 upon an opening of the intake valve 36. As crank shaft 26 serves to rotate the piston 16, the piston head 18 travels along the length of the cylinder interior 20 until it reaches its Bottom Dead Center (BDC) position, which defines the beginning of a compression stroke, illustrated in FIG. 2B. The compression stroke of the six-stroke cycle is characterized by the intake and exhaust valves 36 and 38 respectively, both being maintained in a closed position, such that the upward travel of the piston head 18 within the cylinder interior 20 will cause a compression of the combustible fluid 80 until the piston head 18 reaches its Top Dead Center (TDC) position at the beginning of a third or power stroke, represented in FIG. 2C. Upon compression being completed as the piston head 18 reaches TDC, the ignition source 40 will be activated to ignite the combustible fluid 80 forcing the piston head 18 downwardly into its BDC position and causing the forced rotation of the crank shaft 26. The BDC position of piston head 18 is represented in FIG. 2D which also represents the beginning of the fourth stroke of the six-stroke cycle.

Accordingly, the internal combustion engine 10 of the present invention operates in a substantially conventional fashion through the first three strokes, represented by FIGS. 2A, 2B and 2C of the six-stroke cycle. However, the end of the third stroke at least partially defines what may be considered a first predetermined portion of the six-stroke cycle in that the central processor 44 and the sensor assembly are operably connected to determine the temperature and pressure of the interior 20 of each of the cylinders through activation of the sensor structures $S_2$ and $S_3$. This data is transferred, as at 62 and 63 respectively, to the central processor 44 for determining or calculating the "energy content" of the interior 20 of each of the cylinders 14, starting at the end of the third stroke and continuing through at least the majority of the duration of the fourth stroke as represented in FIG. 2D. The purpose of determining the energy content, at least in terms of calculating and specifically monitoring both the temperature and pressure within each of the cylinders, is to determine the quantity of water to be injected into the cylinder interiors 20 through the one or more injector structures 48. The temperature and pressure must be such as to maintain the injected water in a liquid state during the entire duration of the fourth stroke which, as indicated in FIG. 2D, comprises the mixture of the combustible fluid, subsequent to it being ignited, and the injected water collectively represented as 84. The fourth stroke comprises the piston head moving from a BDC position to a TDC position, thereby decreasing the volume within the cylinder interior 20 and resulting in an increased pressure on the water being injected into the cylinder interior 20. Accordingly, even though the temperature of the water being injected is increasing, the pressure is also increasing which, according to the aforementioned "Steam Tables" forces the water to be maintained in a liquid state as it is being continuously and/or periodically injected to the cylinder interior during at least a majority of the duration of the fourth stroke represented in FIG. 2D. The water being injected is, therefore, prevented from turning into steam as soon as it is injected. The pressure and temperature, as determined by the sensor $S_2$ and $S_3$ respectively, at least partially define the data to enable the central processor 44 to calculate the correct quantity of water to be injected into the interior 20 of the cylinder 14, based on the aforementioned energy content therein, without causing the conversion of water to steam at this point during the fourth stroke. In order to further assure proper and accurate determination of the energy content and as a result, both the quantity of water to be injected and the time or duration of water injection, the sensor structure $S_1$ further inputs into the central processor 44, the temperature of the water prior to it being injected. As set forth above, the hotter the water being injected the less amount of heat required to convert the water from water to steam and the greater amount of water that can be injected into the cylinder interior 20. Further, since the water is injected only during the fourth stroke, which is herein defined as a second predetermined portion of the six-stroke cycle, the pressure exerted on the injected water will be determined by the rate at which the cylinder interior 20 decreases in volume. This, of course, is directly proportional to the rate of the travel of the piston head 18 as it travels from its BDC position to its TDC position during the duration of the forth stroke. As set forth above, in order to absorb the maximum heat without turning into steam, the water must remain within the cylinder, during the fourth stroke for a maximum amount of time in that heat absorption in the fourth stroke depends, at least in part, upon the duration or length of time the stroke exists. This in turn depends upon the time it takes the piston head 18 to travel from its BDC position to its TDC position. Therefore, sensor structure $S_4$ is disposed and structured to determine the engine speed which is directly related to the rate of travel of the piston head 18 within the interior 20 of the cylinder 14 which is determinative of the time duration of the fourth stroke. Upon reaching its TDC position at the beginning of the fifth stroke, as represented in FIG. 2E, the direction of the travel of the piston head 18 will reverse, traveling back towards its BDC position. The resulting increase in the volume of the cylinder interior 20 will decrease the pressure on the water injected during at least a majority of the duration of the fourth stroke (FIG. 2D). This decrease in pressure will allow the water to flash into steam on a continuous basis as the pressure continuously decreases because of the downward travel of the piston head 18 within the cylinder interior 20, resulting in the auxiliary power stroke. Instantaneous "flashing" of all of the water injected during the fourth stroke of FIG. 2D will be prevented since the pressure within the cylinder during the fifth, auxiliary power stroke represented in FIG. 2E, will be sufficient to maintain at least some of the water in a liquid state until the piston approaches the BDC position.

The sixth stroke represented in FIG. 2F is characterized as an exhaust stroke with the intake valve 36 maintained in a closed position and the exhaust valve 38 maintained in an open position, until the end of the sixth stroke. More specifically the combined steam and previously ignited combustible fluid 84' will be exhausted through outlet 88 upon an opening of the exhaust valve 38. It should be noted that the combustible fluid ignited during the initial power stroke, or stroke three, represented in FIG. 2C, will not be exhausted until the sixth stroke and will be exhausted from the interior of the cylinder 20 at the same time as the steam. With reference to FIG. 1, the exhausting of the steam and ignited combustible fluid will pass from outlet 88 to the exhaust system after having first passed through the condenser 52, as set forth above.

In summary, the central processor 44 accomplishes the following based on its responsiveness to the signals received from the plurality of sensors $S_1$, $S_2$, $S_3$ and $S_4$ of the sensor assembly:

a) calculates the "energy content" beginning at the end of the third stroke using the physical characteristics within the cylinder including temperature, pressure and volume as sensed by the sensor assembly and determines the amount of energy that can be extracted from within the cylinder in order to convert the water to steam.

b) calculates the amount of water to be injected based on the previously determined "energy content" as well as the temperature of the water being injected before it enters the cylinder.

c) regulates and/or activates the injector structures 48 so as to inject the correct quantity of water periodically during at least a majority of the fourth stroke, preferably using a plurality of injector structures 48 associated with each cylinder.

d) prevents the turning of water into steam on an instantaneous basis during the fourth stroke but rather regulates the conversion of water to steam substantially continuously over at least a majority of the duration of the fifth stroke, which is defined as the auxiliary power stroke of the six-stroke cycle.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. An internal combustion engine designed to operate on a six-stroke cycle, said internal combustion engine comprising:

a) at least one piston and cylinder assembly including a piston reciprocally mounted within a cylinder and intake and exhaust valves cooperatively mounted to regulate fluid flow into and out of said cylinder and ignition means for igniting a combustible mixture within said cylinder, b) an injection assembly connected in fluid communication between a water supply and said cylinder, c) a sensor assembly at least partially connected to said cylinder and structured to determine physical characteristics within said cylinder, d) a central processor responsive to said sensor assembly so as to determine the energy content within said cylinder during at least a first predetermined portion of the six-stroke cycle, and e) said central processor operatively connected to said injection assembly to control at least the quantity of water injected into said cylinder during at least a second predetermined portion of the six-stroke cycle based on said energy content.

2. An engine as recited in claim 1 wherein said sensor assembly is disposed and structured to determine both temperature and pressure within said cylinder at least during said first predetermined portion of the six-stroke cycle.

3. An engine as recited in claim 2 wherein said first predetermined portion comprises at least the end of a third stroke of the six-stroke cycle.

4. An engine as recited in claim 2 wherein said sensor assembly is further disposed and structured to determine engine speed at least during a fourth stroke of the six-stroke cycle.

5. An engine as recited in claim 4 wherein said sensor assembly is further disposed and structured to determine the temperature of the water prior to its injection into said cylinder.

6. An engine as recited in claim 5 wherein the energy content of fluid within said cylinder is at least partially determined by the temperature and pressure within said cylinder at least during said first predetermined portion of the six-stroke cycle.

7. An engine as recited in claim 6 wherein said first predetermined portion of the six-stroke cycle is defined from the end of the third stroke through at least a portion of the duration of said fourth stroke.

8. An engine as recited in claim 1 wherein said water supply comprises a water jacket mounted in heat transferring relation to said cylinder.

9. An engine as recited in claim 8 wherein said water supply comprises a substantially closed system including a condenser connected in receiving relation to said exhaust valve and a return pump connected to receive water from said condenser and direct the retrieved water to said water jacket.

10. An engine as recited in claim 9 wherein said closed system further includes an injector pump interconnected in fluid communication between said water jacket and said water injection assembly.

11. An engine as recited in claim 1 wherein said injection assembly comprises at least one injector structure operatively connected to said central processor and structured to inject water into said cylinder.

12. An engine as recited in claim 11 wherein central processor is responsive to said sensor assembly for repetitive activation of said injector structure and successive injections of water into said cylinder during said second predetermined portion of said six-stroke cycle.

13. An engine as recited in claim 12 wherein said second predetermined portion of the six-stroke cycle comprises at least a portion of the duration of the fourth stroke.

14. An engine as recited in claim 11 wherein said sensor assembly comprises a first sensor structure and a fourth sensor structure each respectively disposed on the internal combustion engine to determine the heat of the water being injected into said cylinder and the speed of the engine.

15. An assembly as recited in claim 14 wherein said sensor assembly further comprises a second sensor structure connected to said cylinder and structured to determined temperature within said cylinder at least during said first predetermined portion of said six-stroke cycle.

16. An engine as recited in claim 15 wherein said sensor assembly comprises a third sensor structure connected to said cylinder and structured to determine pressure within said cylinder at least during said first predetermined portion of said six-stroke cycle.

17. An engine as recited in claim 11 wherein said injection assembly comprises a plurality of injector structures each operatively connected to said central processor and structured to inject a quantity of water into said cylinder during said second predetermined portion of said six-stroke cycle.

18. An engine as recited in claim 17 wherein said central processor is responsive to said sensor assembly for repetitive activation of each of said injector structures and periodic injection of water into said cylinder during said second predetermined portion of said six-stroke cycle.

19. An engine as recited in claim 18 wherein said second predetermined portion of the six-stroke cycle comprises at least a majority of the duration of the forth stroke.

20. An internal combustion engine designed to operate on a six-stroke cycle, said internal combustion engine comprising:

a) at least one piston and cylinder assembly including a piston reciprocally mounted within a cylinder and intake and exhaust valves cooperatively mounted to regulate fluid flow into and out of said cylinder and an ignition source for igniting a combustible mixture within said cylinder, b) a central processor responsive to energy content within said cylinder at least during a first predetermined portion of the six-stroke cycle and operatively connected to an injection assembly, c) said injection assembly disposed and structured to inject a quantity of water into said cylinder during a second predetermined portion of the six-stroke cycle based at least in part on said energy content, d) a first intake stroke wherein said inlet and exhaust valves are respectively opened and closed and during which a combustible fluid enters said cylinder, e) a second compression stroke and a third power stroke wherein said inlet and exhaust valves are closed and during which said combustible fluid is respectively compressed and ignited, f) a fourth compression stroke wherein said intake and exhaust valves are closed and during which water is injected into said cylinder and the water and ignited fluid are compressed, g) a fifth power stroke wherein said intake an exhaust valves are closed and during which the injected water converts to steam, and h) a sixth stroke wherein said intake and exhaust valves are respectively closed and opened and during which the steam and ignited fluid are exhausted.

21. An engine as recited in claim 20 wherein said first predetermined portion of the six-stroke cycle comprises the end of said third stroke.

22. An engine as recited in claim 21 wherein said second predetermined portion of said six-stroke cycle comprises a majority of the duration of said fourth stroke.

23. An engine as recited in claim 20 wherein said injection assembly is operatively activated by said central processor to inject the quantity of water into said cylinder periodically over at least a majority of the duration of said fourth stroke.

24. An engine as recited in claim 23 wherein at least temperature, pressure and mass of fluid within said cylinder during at least said first predetermined portion of the six-stroke cycle is determinative of said energy content.

25. An engine as recited in claim 24 wherein the quantity of water injected into said cylinder is further based on the temperature of the water prior to it being injected into said cylinder.

26. An engine as recited in claim 25 wherein said first predetermined portion of said six-stroke cycle comprises the end of said third stroke.

27. A method of operation of an internal combustion engine during a six-stroke cycle, said method comprising:
   a) drawing a combustible fluid into a cylinder during a first stroke,
   b) compressing and igniting the combustible fluid respectively during a second stroke and a third stroke,
   c) determining the quantity of water to be injected during the fourth stroke by calculating the energy content within the cylinder,
   d) injecting water into the cylinder without exhausting the ignited fluid and compressing the water and ignited fluid during a fourth stroke,
   e) converting the water into steam while reducing pressure within the cylinder and thereby defining a fifth stroke as a power stroke, and
   f) exhausting the steam and ignited fluid from the cylinder during a sixth stroke.

28. A method as recited in claim 27 comprising injecting the water periodically throughout at least the majority of the duration of the fourth stroke.

29. A method as recited in claim 28 comprising converting the water into steam gradually on a substantially continuous basis throughout a portion of the fifth stroke.

30. A method as recited in claim 29 comprising converting the water into steam throughout at least a majority of the duration of the fifth stroke.

31. A method as recited in claim 27 comprising calculating the energy content by determining at least the pressure and temperature within the cylinder beginning at least at the end of the third stroke.

32. A method as recited in claim 31 comprising further determining the quantity of water to be injected during the fourth stroke by comparing the temperature of water prior to its being injected with the energy content.

33. A method as recited in claim 32 comprising preventing the water from converting to steam during the fourth stroke.

34. A method as recited in claim 33 comprising injecting the water periodically throughout at least the majority of the duration of the fourth stroke.

35. A method as recited in claim 27 comprising preventing the water from converting to steam during the fourth stroke.

* * * * *